United States Patent [19]
Ku et al.

[11] 3,751,262
[45] Aug. 7, 1973

[54] RUMINANT FEED SUPPLEMENT

[75] Inventors: Yuoh Ku, Basking Ridge; Paul W. Simon, Millington, both of N.J.

[73] Assignee: Allied Chemical Corporation, New York, N.Y.

[22] Filed: June 30, 1970

[21] Appl. No.: 51,348

[52] U.S. Cl. ............... 99/2 ND, 260/112, 260/281, 260/326 S, 260/326.3, 424/177, 424/274
[51] Int. Cl. ......................... A23k 1/22, A61k 27/00
[58] Field of Search..................... 424/274; 99/2 ND

*Primary Examiner*—Sam Rosen
*Attorney*—Arthur J. Plantamura and Herbert G. Burkard

[57] ABSTRACT

A ruminant feed containing from about 0.02 to about 5.0 weight percent of an imide resistant to digestion in the rumen but digestible in subsequent regions of the ruminant gastrointestinal tract, said imide being a member selected from the group consisting of:

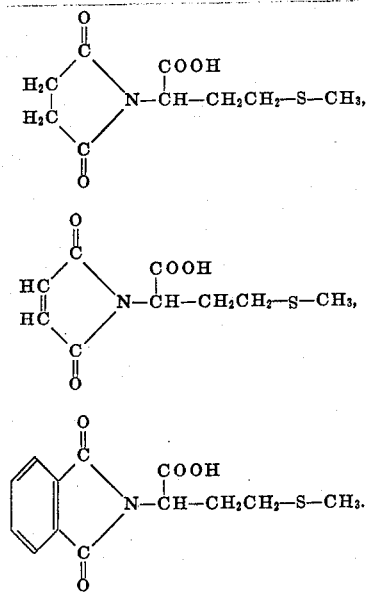

4 Claims, No Drawings

RUMINANT FEED SUPPLEMENT

Amino acids are the building blocks in the synthesis of proteins. When the carboxyl group of one molecule of an amino acid unites with the amino group of a neighboring amino acid, an amide is formed, e.g. $H_2NCH_2COOH + H_2NCH(CH_3)COOH \rightarrow H_2NCH_2CONHCH(CH_3)COOH$.

Such intermolecular amides are known as peptides. The reaction may be continued at either end of the peptide molecule to form a tripeptide, tetrapeptide, etc. Peptides made up of more than ten amino acids are usually called polypeptides. Proteins are essentially polypeptides in which the number of amino acid molecules present generally varies from about 300 to about 1000, even though in some instances the number of amino acid molecules may exceed 100,000. Molecular weights may vary from about 15,000 to several million. All proteins contain carbon, hydrogen, oxygen and nitrogen. Most also contain sulfur and many contain phosphorous and other elements.

For growth, maintenance, reproduction and tissue repair, animals require a supply of specific amino acids and proteins which vary with the animal species involved. If these specific amino acids and proteins are not able to be synthesized by the animal in sufficient amounts, then they must be fed to the animal directly, for example as feed supplements.

It is known that ruminants such as cows, sheep, camels and goats form a special class of animals in view of their digestive system. Ruminants have a complex stomach of several compartments. The first compartment, known as the rumen, contains numerous microorganisms which break down ingested proteins and amino acids into other compounds, such as low molecular weight peptides and ammonia. Simultaneous with this breaking down process there occurs a synthesis of microbial proteins in the rumen.

The microbial protein, however, is generally not the same as the protein ingested by the ruminant. Thus when a ruminant is deficient in certain proteins or amino acids, it cannot always obtain these proteins or amino acids by supplementation of its feed, since such proteins or amino acid supplements would also be broken down by the microorganisms of the rumen.

One important improvement in ruminant feeds would be a method which would prevent the breaking down of supplementary amino acids and proteins in the rumen but would still allow for their digestion and absorption in subsequent parts of the gastrointestinal tract, such as in the abomasum and the small intestine.

SUMMARY OF THE INVENTION

It is an object of this invention to provide a method of improving the nutrition of a ruminant.

It is a further object of this invention to provide a method of introducing various amino acids and proteins into a ruminant so that digestion of these amino acids and proteins does not occur in the rumen but does take place in one or more of the subsequent regions of the gastrointestinal tract.

It is another object of this invention to provide a novel ruminant feed.

It has now been found that the compounds useful in the practice of this invention are imides formed by the reaction of an organic anhydride and an alpha amino acid or protein, said compounds having the formula $$AX_n \quad (I)$$

wherein A is an alpha amino acid radical or a protein radical, formed by the loss of 2 hydrogen atoms from an amino group therein, X is a moiety having the structural formula

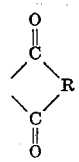

wherein R is a divalent aliphatic, aromatic, alicyclic or polymeric structure, and $n$ is an integer from 1 up to the number of free amino groups in the amino acid or protein from which A is derived; each X being connected to A at a different nitrogen atom of a free amino group.

By "alpha amino acid" is meant a carboxylic acid in which the $-NH_2$ group is attached to the carbon atom immediately adjacent to the COOH group, e.g. methionine, $H_3C-S-(CH_2)_2CH(NH_2)-COOH$. By "free amino group" is meant a primary amino group, i.e. one having 2 hydrogen atoms on the nitorgen. In proteins these free amino groups can either be terminal groups or any other free amino group in the molecule.

As used in this specification and in the appended claims in term protein also includes peptides and polypeptides.

When compounds of Formula I are fed to ruminants, they pass through the rumen substantialy undigested, but are digested in subsequent regions of the gastrointestinal tract where they are hydrolyzed to the free amino acids and then absorbed into the bloodstream of the ruminant.

DETAILED DESCRIPTION

The compounds of Formula I are generally prepared by reacting an alpha-amino acid or a protein with an organic anhydride in the liquid phase at a temperature between about 100°C. and the degradation temperature of the reactants. The reactants may be melted to form the liquid phase and then reacted as such, or an organic solvent, such as toluene or xylene, may be added to the reactants to give improved temperature control. Alternatively, in the reaction between a protein and an organic anhydride, the organic anhydride may be dissolved in a suitable organic liquid, such as xylene and added to the protein. In such case the protein is not put into solution but is only wetted with the anhydride solution. The reaction is illustrated by the following example, wherein the reactants are succinic anhydride and threonine:

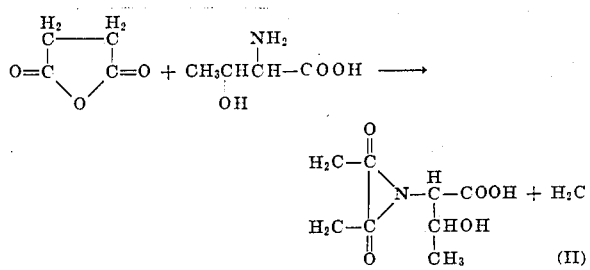

Because of the complex structure of protein molecules, it is difficult to illustrate the reaction of an entire protein molecule. However, the reaction of a portion of a protein molecule with an anhydride, e.g. maleic anhydride, is illustrated below

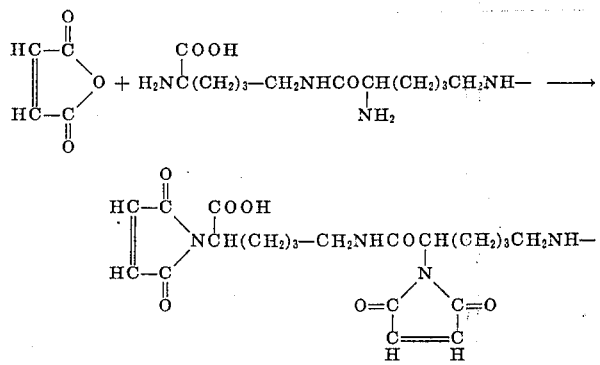

The above reaction between the anhydride and the free amino group may be repeated throughout the protein molecule.

The greater the percent of free amino groups which react with the anhydride, the greater the change of the imide product passing through the rumen undigested. It is preferred that essentially all the free amino gropus are so reacted.

The reaction temperature employed preferably ranges from about 100° to 180°C., most preferably from about 110° to about 140°C.

Reaction time is not critical, generally ranging from about 0.5 to about 8 hours, preferably from about 1 to about 4 hours.

Examples of the organic anhydrides which are suitably reacted with proteins or alpha-amino acids are succinic anhydride, maleic anhydride, phthalic anhydride, glutaric anhydride, hexahydro phthalic anhydride, cix-4-cyclohexene-1,2-dicarboxylic anhydride, ethylene maleic anhydride copolymer, methyl vinyl ether maleic anhydride copolymer, styrene maleic anhydride copolymer, and alkyl derivatives thereof wherein said alkyl contains from 1 to 3 carbon atoms. The maleic anhydride copolymers generally have molecular weights up to about 30,000.

Protein molecules are so complex that nomenclature is virtually impossible. Proteins therefore are usually characterized by their source, i.e. the material containing the protein which is to be reacted. Proteins are therefore generally grouped under the headings of vegetable protein, animal protein, and single cell protein.

Illustrative of the vegetable proteins which may be reacted with the above anhydrides to form the compounds of Formula (I) are proteins of grains such as corn, wheat and rice; starchy roots such as yams; pulses such as peas, beans and lentils; oilseeds such as cotton seed, soybeans and peanuts; nuts; vegetables such as spinach and sorrel; and fruit.

Among the animal proteins which may be reacted are proteins of meat, poultry, eggs, fish, milk, and mild products. Specific animal proteins are albumin and casein.

Among the useful single cell proteins are proteins derived from microbes such as *Candida lipolytica*, from fungi such as *Heterocephalum aurantiacum*, and from yeasts such as *Torula utilis*.

The preferred protein radical of Formula (I) is derived from a vegetable protein source, especially from a grain protein source, such as corn, and an oilseed protein source, such as soybean.

The protein which is reacted with the anhydride may be either in concentrated form or part of the original source material, which is generally ground up prior to the reaction. Proteins may be concentrated by methods such as solvent extraction of the unwanted constituents (e.g. carbohydrates, fats, etc.) of the source material; or by impulse-rendering of the source material in aqueous alkali. The above methods are more fully described in World Protein Resources, Advances in Chemistry Series No. 57, American Chemical Society (1966), the pertinent parts of which are hereby incorporated by reference. It is preferred that the protein concentration of the source material be at least about 30 weight percent.

Generally, the alpha amino acid radical of Formula (I) is derived from an alpha amino acid selected from the group consisting of arginine, histidine, isoleucine, leucine, lysine, methionine, phenylalanine, threonine, tryptophan, valine, alanine, asparatic acid, cystine, glutamic acid, glycine, hydroxy-glutamic acid, hydroxy-proline), isoleucine, proline, serine and tyrosine.

Preferably the alapha-amino acid is tryptophan, methionine, glutamic acid, lysine, histidine, valine, leucine, isoleucine, threonine or tyrosine.

Most preferably the alpha amino acid is methionine, lysine or threonine.

In general, it is the levo forms of the amino acids which are converted to proteins and are thus useful in this invention. However, with some of the amino acids, e.g. methionine, both the levo and dextro rotary forms are useful.

Preferably, R is selected from the group consisting of:

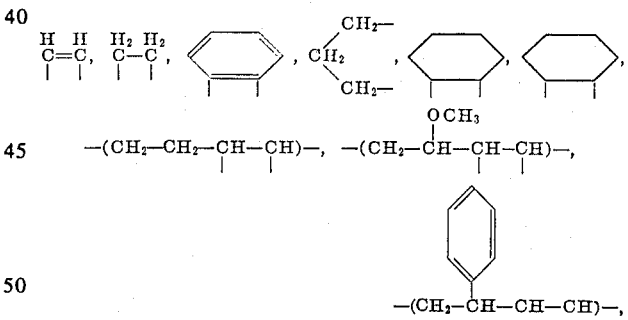

and derivatives thereof wherein one or more of the hydrogens present are substituted with an alkyl group of 1 to 3 carbon atoms.

Most preferably R is

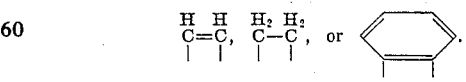

The compounds most preferred for use in the practice of this invention are imides formed by reacting methionine with succinic anhydride, maleic anhydride or phthalic anhydride, said imides having the respective formulas:

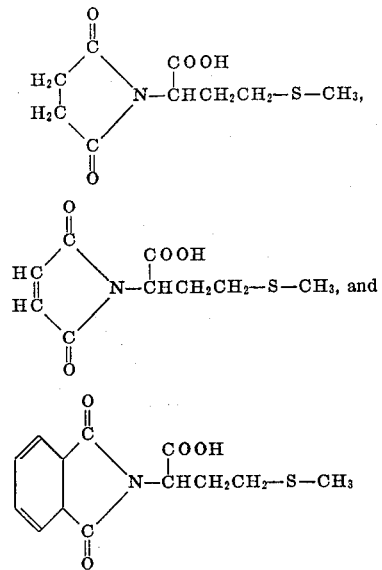

Nutritive amounts of the imide compounds of this invention can be fed to ruminant animals either alone or incorporated into conventional ruminant feeds. For example one or more of the imides may be conveniently incorporated into a ruminant feed for use in meal or in compressed shaped form such as briquettes or pellets. Typical ruminant feeds usually contain solid edible carbohydrate materials. Some of the various ruminant carbohydrate feed materials which may be supplemented with the imides of this invention are alfalfa, corn, barley, flax meal, silage, molasses, cottonseed meal, and the like.

By such supplementation, a novel feed is produced which provides a source of amino acids and proteins which for the most part are not broken dwon in the rumen where the pH is usually about 6–7, but which are digested and absorbed in subsequent regions of the gastrointestinal tract having a more acid nature. Although it is preferred that all of the imides ingested pass through the rumen without being broken down by the microorganisms therein, it is acceptable if as few as 50 percent do so.

The amount of imide fed to a ruminant depends on several factors, such as the particular species of ruminant, its size, age, and the like. In general it is desired that the amount of imide fed to the ruminant be such that during a 24 hour period the amino acid or protein absorbed by the ruminant from the ingested imides ranges from about 0.5 to about 4.0 grams per kilogram of ruminant body weight.

The proportion of imide in the ruminant feed depends upon the particular feed and the needs of the ruminant. The feed may consist entirely of the imide, but generally will be a mixture of the imide and a conventional ruminant feed. Preferably the imide will constitute from about 0.02 to about 5.0 weight percent of the conventional feed.

Illustrative of the compounds useful in the practice of this invention are the following:

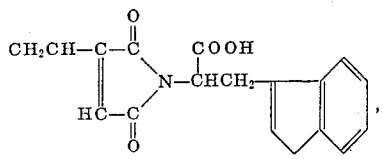

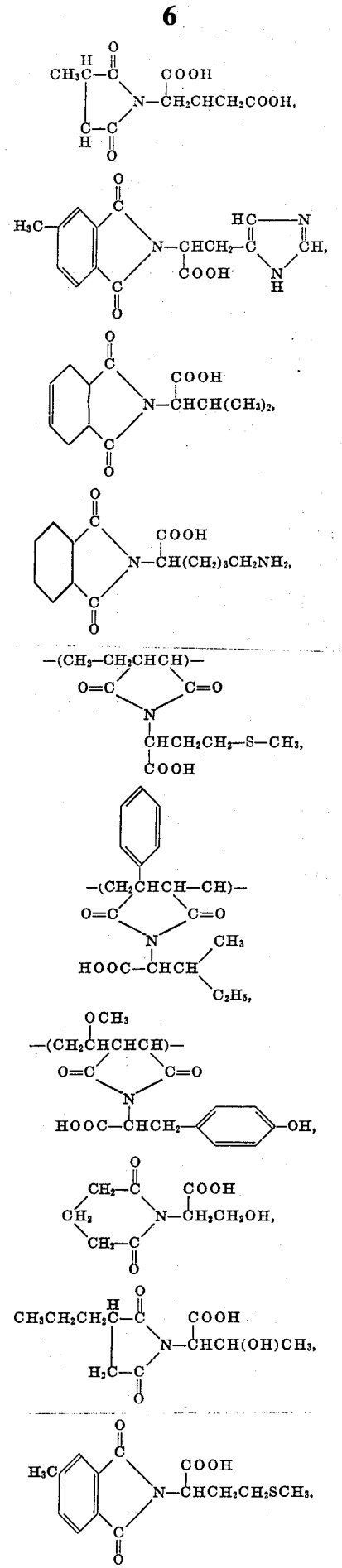

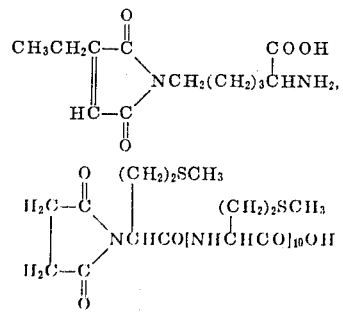

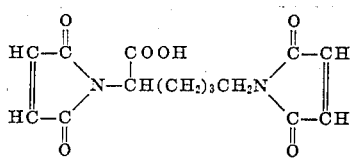

and the like.

The invention can be more fully understood by reference to the following examples.

EXAMPLE 1

Equimolar amounts of maleic anhydride and methionine are added to xylene. The mixture is heated to 140°C. and refluxed at that temperature, with stirring, for about four hours. Evolved water is removed with an azeotrope tube (i.e. a Dean-Stark trap). The resultant solution is then cooled to room temperature and the liquid decanted off. The remaining solids are dried. Resistance of the solids to hydrolysis is tested at various levels of pH. At the pH of the rumen (pH of 6–7), no free methionine is detected. At the pH of the abomasum (pH of 2), free methionine is detected.

EXAMPLE 2

Equimolar amounts of phthalic anhydride and methionine are mixed together and melted at 120°–140°C. over a period of 30 minutes). Xylene is then added and the solution refluxed for one hour at 137°C. The reflux takes place with stirring and under a nitrogen atmosphere. Water is removed with an azeotrope tube. After refluxing, the solution is cooled to room temperature and the liquid removed. The remaining solids are dried. Resistance of the solids to hydrolysis is tested at various levels of pH. At the pH of the rumen (pH of 6–7), no free methionine is detected. At the pH of the abomasum (pH of 2), free methionine is detected.

EXAMPLE 3

Equimolar amounts of succinic anhydride and methionine are mixed with xylene and heated, with stirring, at a reflux temperature of 135°–138°C. for about 4 hours. Water is removed with an azeotrope tube during reflux. The solution is cooled and liquid removed. The remaining solids are dried. Solubility of the solids are tested at various levels of pH. At the pH of the rumen (pH of 6–7), no methionine is detected At the pH of the abomasum (pH of 2), some methionine is detected.

EXAMPLE 4

The procedure of Example 1 is repeated reacting equimolar amounts of lysine and maleic anhydride, lysine and succinic anhydride, and lysine and phthalic anhydride. The imides formed have the respective formulas

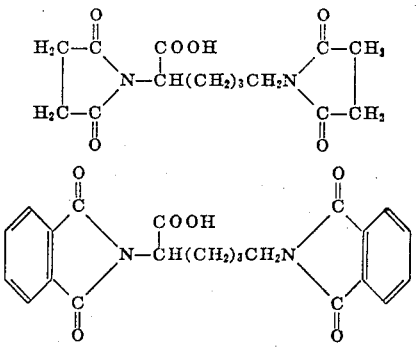

The above imides have hydrolysis properties substantially similar to those produced in Example 1.

EXAMPLE 5

The procedure of Example 1 is repeated reacting equimolar amounts of threonine and maleic anhydride, threonine and succinic anhydride, and threonine and phthalic anhydride. The imides formed have the respective formulas

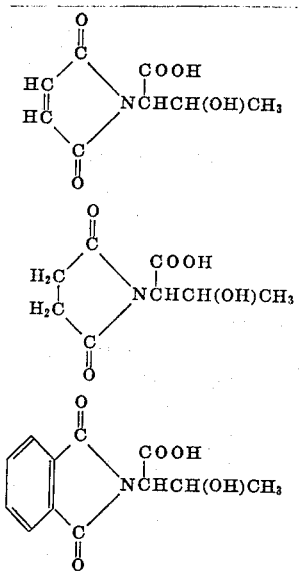

The above imides have hydrolysis properties substantially similar to those produced in Examples 1.

EXAMPLE 6

To 100 parts by weight of ground soybean is added 1 part by weight of succinic anhydride in xylene. The mixture is heated to 140°C for 1 hour and then dried. The resistance to hydrolysis of the product is tested at various pH levels. At the pH of the rumen (pH of 6–7), no free protein is detected. At the pH of the abomasum (pH of 2), free protein is detected.

EXAMPLE 7

A sample of each of the imides formed in Examples 1–6 is placed in individual beakers containing rumen fluid (pH of 6–7). After 4 hours the fluid is analyzed and there is no indication of any free amino acids or ammonia. Methionine, lysine and threonine are added to individual beakers of rumen fluid and, within minutes, free amino acids are detected.

EXAMPLE 8

A quantity of each of the imides of Examples 1–6 is fed to individual ruminants. Within 12 hours the presence of the amino acid or protein constituent of the imide is detected in the blood of each of the ruminants.

We claim:

1. A nutritive composition comrpising a ruminant feed containing from about 0.02 to about 5.0 weight percent of an imide resistant to digestion in the rumen but digestible in subsequent regions of the ruminant gastrointestinal tract, said imide being a member selected from the group consisting of:

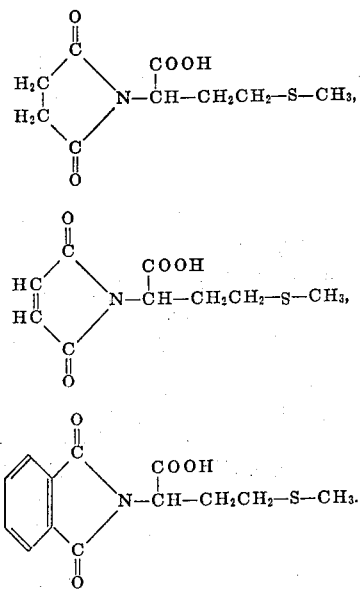

2. The ruminant feed of claim 1 wherein the imide is

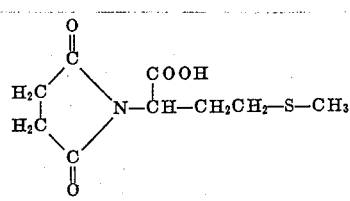

3. The ruminant feed of claim 1 wherein the imide is

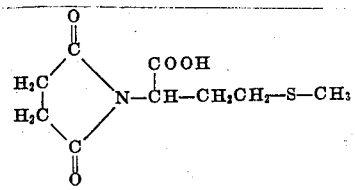

4. The ruminant feed of claim 1 wherein the imide is

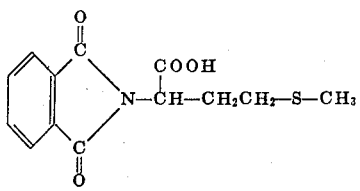

* * * * *

PO-1050
(5/69)

UNITED STATES PATENT OFFICE
CERTIFICATE OF CORRECTION

Patent No. 3,751,262          Dated August 7, 1973

Inventor(s) Ku et al.

It is certified that error appears in the above-identified patent and that said Letters Patent are hereby corrected as shown below:

Column 9, line 24, the word --and-- should be inserted after the comma

Column 10, lines 17 and 18 the formula 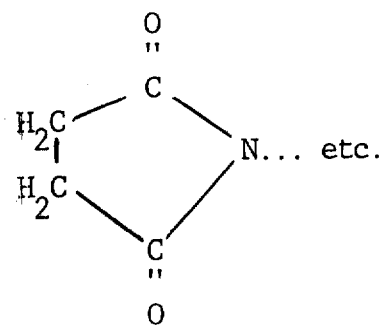

should read -- 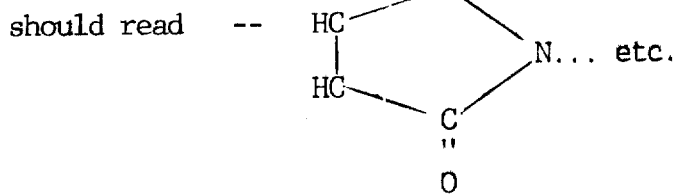

Signed and sealed this 27th day of November 1973.

(SEAL)
Attest:

EDWARD M. FLETCHER, JR.
Attesting Officer

RENE D. TEGTMEYER
Acting Commissioner of Patents